Jan. 22, 1957 J. E. FATE, JR 2,778,602
TRAVELING BLOCK
Filed Feb. 2, 1954

INVENTOR.
J. E. FATE, JR.
BY
ATTORNEY

United States Patent Office 2,778,602
Patented Jan. 22, 1957

2,778,602

TRAVELING BLOCK

Jessee E. Fate, Jr., Tulsa, Okla.

Application February 2, 1954, Serial No. 407,660

4 Claims. (Cl. 254—192)

This invention relates to improvements in traveling blocks and more particularly, but not by way of limitation, to an improved hook connecting device for use in the lower end of a traveling block.

As it is well known in the oil well drilling industry, the usual oil well derrick is provided with a traveling block suspended by a plurality of cables from the top of the derrick for supporting a hook. The hook is in turn used for engaging drill pipe and the like for raising and lowering the drill pipe within the derrick. The traveling blocks and hooks must be of a strength to lift and handle excessive weights, therefore, both the hook and the traveling block are ordinarily very large and too heavy to be easily manipulated by workmen around the derrick. In the present day traveling block assemblies, the hook is connected to the lower end of the traveling block by a single pivotal connection, thereby permitting the hook to swing with respect to the traveling block in only one plane. It will be apparent that in using hooks and traveling blocks of large size, the limited swinging movement of the hook relative to the block will greatly impair the efficient operation of the well drilling installation. Furthermore, the handling necessary to place the larger sizes of present day hooks and blocks in the desired positions for engaging drill pipe and the like is an inherently dangerous operation.

The present invention contemplates a traveling block having a novel connecting device in the lower end thereof for receiving the shank of the hook in such a manner that the hook may be swung or pivoted relative to the traveling block in two different planes or four directions. The greater freedom given to the hook by the present invention will facilitate the connection of the hook to drill pipe and the like and substantially increase the safety in the hooking and disconnecting operations.

An important object of this invention is to facilitate the handling of traveling blocks and hooks.

Another object of this invention is to increase the safety of oil well drilling operation and the like utilizing traveling blocks.

Another object of this invention is to provide a novel hook connection for a traveling block which may be easily installed on a large number of the present day traveling blocks without modification of the blocks.

A further object of this invention is to provide a simply constructed hook connection for traveling blocks which may be economically manufactured.

Other objects and advantages of the invention will be evident from the following detailed description, read in conjunction with the accompanying drawings, which illustrate my invention.

Figure 1:
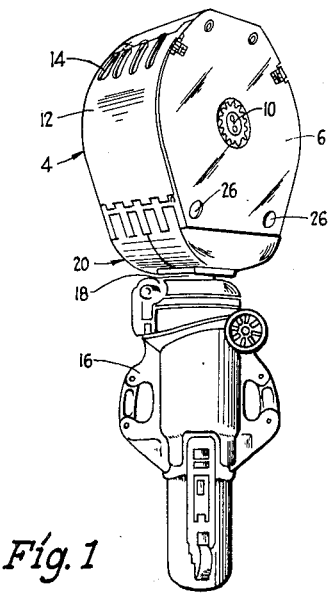
Figure 1 is a perspective view of a traveling block with a hook suspended therefrom.

Referring to the drawings in detail, and particularly Fig. 1, reference character 4 generally designates a traveling block having the usual stationary side plates 6 with a plurality of sheaves 8 (see also Fig. 2) rotatably supported between the side plates 6 on a shaft or pin 10. Arcuate guard plates 12 are removably secured over the edges of the side plates 6 to cover the sheaves 8. The guard plates 12 have the usual slots 14 in the upper ends thereof for the reception of cables (not shown) which extend downwardly around the sheaves 8 from the top of a derrick or the like (not shown). A hook 16 is suspended from the traveling block 4 through the use of the shank 18 extending upwardly from the hook and a novel connecting device generally indicated at 20 and shown in detail in Figs. 2 and 3.

The connecting device 20 comprises a pair of brackets 22 substantially C-shaped in transverse cross section adapted to be secured in end to end contacting relation between the side plates 6 below the sheaves 8. A plurality of upwardly and outwardly extending apertured ears 24 (see Fig. 3) are provided on each side of each bracket 22 to receive the usual connecting bolts 26 extending through the side plates 6. Centering straps or projections 28 extend downwardly from the guard plates 12 into the slots 29 between the ears 24 to facilitate centering of the guards.

The outer end 30 of each bracket 22 is enclosed and provided with an outwardly extending shoulder 32 adapted to mate with the lower end of the respective side plate 6 and align the brackets 22 upon installation of the connecting device 20. It will also be observed that the ends 30 are rounded off to eliminate sharp edges which might be dangerous to workmen utilizing the block 4.

Figure 3:
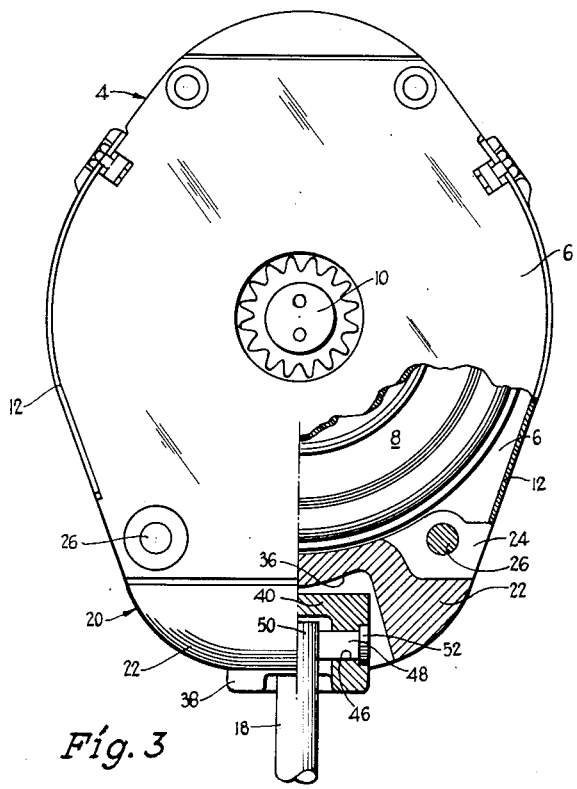
Figure 3 is an elevational view of the traveling block taken at right angles to Fig. 2 and with a portion of the block removed.
Figure 2:
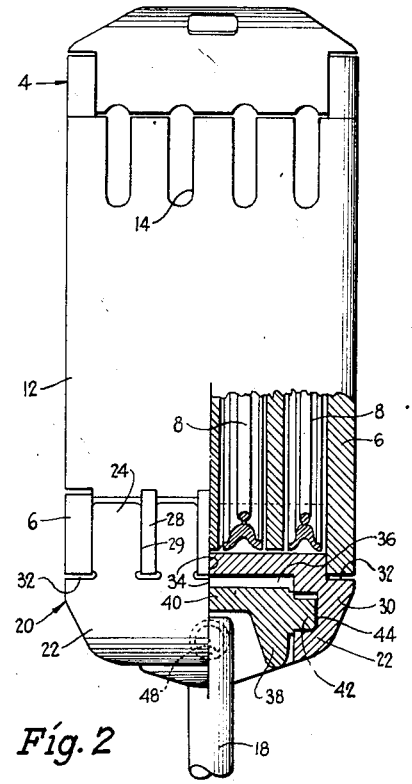
Figure 2 is an elevational view of the traveling block and the shank of a hook with a portion of the block removed.

When the brackets 22 are assembled as shown in Figs. 2 and 3 with their inner ends 34 in contacting relation, they form an enlarged box-like chamber 36 opening in a downward direction. A hollow connecting member 38, having its upper end 40 enclosed, extends upwardly into the chamber 36. Diametrically opposed trunnions 42 extend horizontally outward from opposite sides of the connecting member 38 into mating recesses 44 formed in the enclosed ends 30 of the brackets 22 at the ends of the chamber 36. The trunnions 42 and recesses 44 are of a size to provide a sliding fit of the trunnions 42 and permit a pivoting or swinging movement of the connecting member 38 in one plane.

The connecting member 38 is also provided with diametrically opposed and aligned apertures 46 (see Fig. 3) extending in a direction at right angles to the trunnions 42. Also, the apertures 46 are formed slightly lower in the connecting member than the trunnions 42. A pin or shaft 48 extends through the apertures 46 and the upper end 50 of the hook shank 18 to pivotally support the shank 18 in the connecting member 38. A head 52 is formed on one end of the shaft 48 and a suitable fastening means (not shown) is formed on the opposite end of the shaft 48 to prevent removal or loss of the shaft during operation of the traveling block 4.

The traveling block 4 and hook 16 are assembled by first placing the upper end 50 of the hook shank 18 in the connecting member 38 and installing the shaft 48. The brackets 22 are then placed over the connecting member 38 with the recesses 44 receiving the trunnions 42 as shown in Fig. 2; whereupon, the brackets 22 are inserted between the side plates 6, and the connecting studs or bolts 26 are installed. It will then be apparent that the hook 16 may be pivoted with respect to the traveling block 4 in two different planes at right angles to one another. It will also be noted that the shaft 48 is disposed in a lower position than the trunnions 42 to impose the weight of the hook 16 directly on the lowermost pivotal connection, thereby providing the maximum freedom in the pivoting of the hook 16 and preventing any tendency of the connecting member 38 to become inverted or wedged in the brackets 22.

From the foregoing, it is apparent that the present invention will greatly facilitate the handling of traveling blocks and hooks, and particularly traveling blocks and hooks in the larger sizes and weights, to increase the safety of oil well drilling operation and the like. The present connecting device may be installed in a large number of the present day traveling blocks without the necessity of modifying the traveling blocks in any manner. It will also be apparent that the hook connecting device is simply constructed and may be economically manufactured.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A traveling block for transporting a hook, comprising a pair of stationary side plates, at least one sheave rotatably secured between the side plates, a bracket secured to the side plates below the sheave, a connecting member pivotally secured to the bracket, and a shaft pivotally secured in a horizontal direction in the connecting member at right angles to the pivotal connection of the connecting member in the bracket, said shaft being arranged to extend through the upper end of the hook whereby the hook will be pivotally secured to the traveling block to permit pivotal rotation thereof in four directions.

2. A traveling block for transporting a hook, comprising a pair of stationary side plates, at least one sheave rotatably secured between the side plates, a bracket secured to the side plates below the sheave, said bracket having horizontally extending and diametrically opposed recesses therein, a connecting member extending vertically into the bracket and having a pair of trunnions thereon pivotally supported in said recesses, and a horizontally extending shaft pivotally supported in the connecting member at right angles to said trunnions to pivotally support the hook.

3. A traveling block for transporting a hook, comprising a pair of stationary side plates, at least one sheave rotatably secured between the side plates, a bracket secured to the side plates below the sheave, said bracket having horizontally extending and diametrically opposed recesses therein, a connecting member extending vertically into the bracket and having a pair of trunnions thereon pivotally supported in said recesses, and a horizontally extending shaft pivotally supported in the connecting member at right angles to said trunnions to pivotally support the hook and provide pivotal movement thereof in four directions, said shaft being disposed below said trunnions.

4. A hook connecting device for a traveling block having stationary side plates and a plurality of sheaves rotatably supported between the side plates, comprising a bracket of a size to be secured between the side plates below the sheaves, said bracket having an enlarged chamber in the lower end thereof with smaller recesses in opposite sides of the chamber extending horizontally in aligned relation, a hollow connecting member extending into the chamber and having trunnions thereon pivotally supported in the recesses, said connecting member being of a size to receive the upper end of the hook, and a shaft extending transversely through the connecting member at right angles to said trunnions and below the trunnions for pivotally supporting the hook in the connecting member to provide pivotal movement thereof in four directions.

References Cited in the file of this patent

UNITED STATES PATENTS

| | | |
|---|---|---|
| 1,536,617 | Montgomery | May 5, 1925 |
| 2,140,086 | McKissick | Dec. 13, 1938 |
| 2,672,320 | Minor | Mar. 16, 1954 |